(12) United States Patent
Tomita

(10) Patent No.: US 7,059,667 B2
(45) Date of Patent: Jun. 13, 2006

(54) COMBINED STRUCTURE OF FRONT PART OF CABIN OF AUTOMOBILE

(75) Inventor: Tatsuzo Tomita, Ohbu (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 74 days.

(21) Appl. No.: 10/800,408

(22) Filed: Mar. 12, 2004

(65) Prior Publication Data

US 2004/0189055 A1    Sep. 30, 2004

(30) Foreign Application Priority Data

Mar. 12, 2003    (JP)    ............................. 2003-066719

(51) Int. Cl.
    *B62D 25/08*    (2006.01)

(52) U.S. Cl. .................................... 296/203.03; 296/30

(58) Field of Classification Search ........... 296/203.02, 296/193.09, 187.09, 70, 30, 203.03
    See application file for complete search history.

(56) References Cited

U.S. PATENT DOCUMENTS 5,562,329 A * 10/1996 Srock et al. ............ 296/203.01
6,364,401 B1 * 4/2002 Kim ....................... 296/203.02

FOREIGN PATENT DOCUMENTS

JP    2531718    1/1997

* cited by examiner

*Primary Examiner*—Joseph D. Pape
(74) *Attorney, Agent, or Firm*—Rossi, Kimms & McDowell, LLP

(57) ABSTRACT

A combined structure of a front part of a cabin of an automobile has a dash panel and a front pillar. The dash panel is placed in the front part of the cabin, extending in the width direction of an automobile, and forms a tire house bulged inward of the cabin at both left and right lower sides. The dash panel has a panel flange extending rearward from the both edges. The front pillar is formed by a front pillar inner and a front pillar outer joined at pillar flanges where they are faced each other in the width direction. In the front pillar, the pillar flanges extending in the forward of vehicles are joined to the panel flange. The front end of the pillar flange is located more rearward than the edge of the dash panel.

7 Claims, 3 Drawing Sheets

COMBINED STRUCTURE OF FRONT PART OF CABIN OF AUTOMOBILE

CROSS-REFERENCE TO RELATED APPLICATIONS

This application is based upon and claims the benefit of priority from prior Japanese Patent Application No. 2003-066719, filed Mar. 12, 2003, the entire contents of which are incorporated herein by reference.

BACKGROUND OF THE INVENTION

1. Field of the Invention

The present invention relates to a combination structure of a front part of a cabin of an automobile, and a combining method.

2. Description of the Related Art

An automobile has a dash panel, a cowl side panel, a hinge pillar (a front pillar), a side member, and a cross member, in the structure of front part. Refer to, for example, FIG. 1, FIG. 3 and FIG. 13 of Jpn. UM Registration No. 2531718. The dash panel is placed in the front part of a cabin crossing the width direction of the automobile. The cowl side panel is joined to the left and right sides of the dash panel, and extended rearward.

The front pillar is joined to the rear end of the cowl side panel, forming a closed section against the cowl side panel. Each of left and right side members is joined to the dash panel at a position more inside than a front pillar, and placed forward from the dash panel. The cross member forms a closed section against the dash panel, and placed in the width direction of a body, connecting the rear end of the side member.

When the cross member is attached the dash panel from inside of the cabin, both ends of the cross member is bent rearward along the dash panel and cowl side panel, and joined to the front pillar. When the cross member is attached the dash panel from outside of the cabin, both ends of the cross member are joined to the side member. A reinforcing member is fit along the dash panel and cowl side panel, between the front pillar and the inside of the cabin of the dash panel at the position fit with the side member.

However, in the above structure, the flange combining the dash panel and cowl side panel is made at the position face to the outer circumference of a tire. Therefore, the dash panel and cowl side panel must be provided rearward from the tire with a space equivalent to the flange, to prevent the tire from contacting to the flange causing a burst. Thus, the cabin is narrowed. Besides, since the position of the front pillar is backed, the position of providing a front seat door is shifted rearward, making it uneasy to get on and off the cabin.

When the cross member is provided inside of the cabin, there are a few part difficult to approach by a torch for spot welding in order to join an area between the cross member and the dash panel after the side member and the dash panel have been attached. Similarly, when the cross member is provided outside of the cabin, there are a few part difficult to approach by a torch for spot welding in order to join the area between the dash panel and the reinforce member after the side member and the dash panel have been joined, to join the area between the end portion of the cross member and the side member after the dash panel and the reinforce member have been joined.

Therefore, it is necessary to cut any portion to make an approaching hole to insert a torch. But, this is undesirable, because if the approaching hole that is a kind of opening is made in the strength member, the strength is decreased.

BRIEF SUMMARY OF THE INVENTION

The present invention provides a combined structure of a front part of a cabin of an automobile with sufficient strength while keeping a cabin space.

A combined structure of a front part of a cabin of an automobile according to the present invention has a dash panel and a front pillar. The dash panel is placed in the front part of the cabin, extending in the width direction of the automobile, and forms a tire house which is bulged inward of the cabin at both left and right lower sides. The dash panel has a panel flange extending rearward from both side edges. The front pillar is formed by a front pillar inner and a front pillar outer joined to pillar flanges where they are faced each other in the width direction. In the front pillar, the pillar flange extending in the forward is joined to the panel flange. The front end of the pillar flange is located more rearward than the edge of the dash panel.

The combined structure of a front part of a cabin of an automobile according to the present invention further comprises a reinforcing member which is attached over the dash panel and the front pillar inner. In this case, the combined structure of a front part of a cabin of an automobile further comprises a side member which extends forward and has a rear end joined to the dash panel, and the reinforcing member is joined to the dash panel where the side member has been attached from the outside of cabin. The front pillar inner has an inside wall, and a front wall bended outward from the front end of the inside wall. The rear wall of the reinforcing member comes into contact with a bending portion formed between the inside wall and the front wall. Further, the combined structure of a front part of a cabin of an automobile further comprises a cross member which is extended in the width direction of the automobile and joined to the front side of the dash panel from the outside of cabin while the rear end of the side member is joined to the cross member. In this case, the panel flange is joined to the pillar flange from the inside of the cabin. In the combined structure of a front part of a cabin of an automobile, considering the sealing of the cabin, the panel flange is inserted and joined between the pillar flange of the front pillar inner and the pillar flange of the front pillar outer.

A method of combining a front part of a cabin of an automobile according to the present invention includes a step of joining a panel flange which extends rearward from the both side edges of the dash panel, to a pillar flange which extends forward from a front pillar inner that forms a front pillar with a front pillar outer, at a position where the front end of the pillar flange is located more rearward than the both side ends of the dash panel; a step of joining a reinforcing member to the dash panel and the front pillar inner; a step of joining both ends of a cross member which extends in the width direction of the automobile, to the rear end of a side member which extends forward; a step of joining the cross member and the side member, which have been joined each other, to the dash panel; and a step of joining the pillar flange of the front pillar inner and a pillar flange of the front pillar outer.

DETAILED DESCRIPTION OF THE INVENTION

Figure 1:
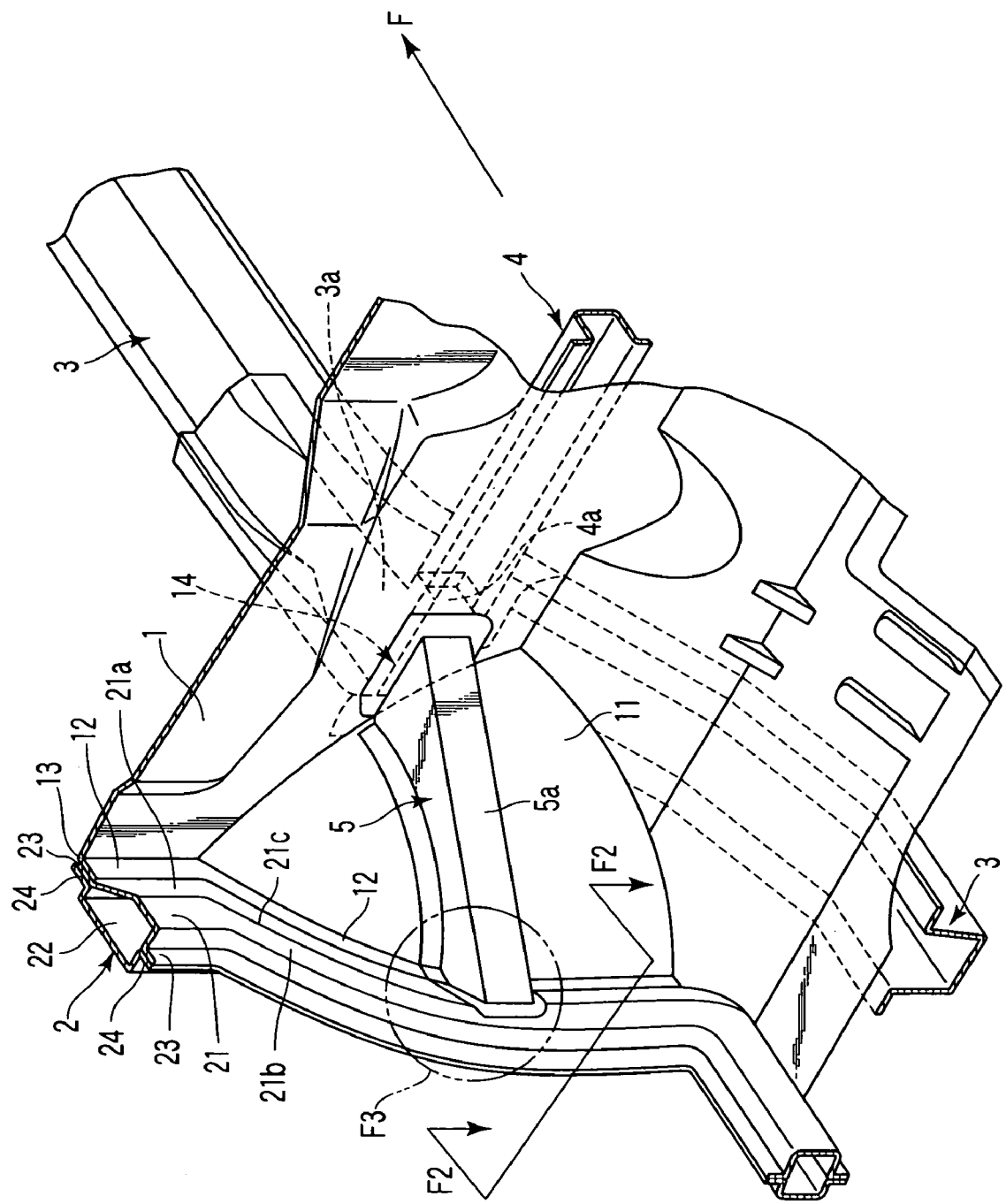
FIG. 1 is a perspective view of a combined structure of a front part of a cabin of an automobile according to an embodiment of the present invention, viewed from the inside of the cabin.

A combined structure of a front part of a cabin of an automobile according to an embodiment of the present invention will be described with reference to FIG. 1 to FIG. 3. The front, rear, left and right are defined by taking the automobile advancing direction F as a reference, and the direction toward the center of the automobile is assumed inside, and the direction separating away from the center of the automobile is assumed outside. FIG. 1 shows the state near the combined part of a dash panel 1 and a front pillar 2 on the front left side of the automobile, viewed from the inside of the cabin. As shown in FIG. 1, the combined structure of a front part of the cabin of the automobile includes the dash panel 1, the front pillar 2, a side member 3, a cross member 4, and a reinforcing member 5.

The dash panel 1 is placed in a front part of the cabin, crossing the width direction of the automobile. The lower end of the dash panel 1 extends rearward to the floor panel of the cabin. The left and right lower sides of the dash panel 1, a tire house 11 is formed, which bulges inward of the cabin, so as to avoid a front wheel. The front pillar 2 is placed on the left and right sides of the dash panel 1, curving along both ends of the dash panel 1. The front pillar 2 has an inner 21 as a front pillar inner facing the inside of the cabin, and an outer 22 as a front pillar outer facing the outside of the cabin. The inner 21 and outer 22 are provided with pillar flanges 23 and 24, respectively, extending in the direction to project from the outer circumference of the front pillar 2, and joined by these pillar flanges 23 and 24, forming a front pillar 2.

Figure 2:
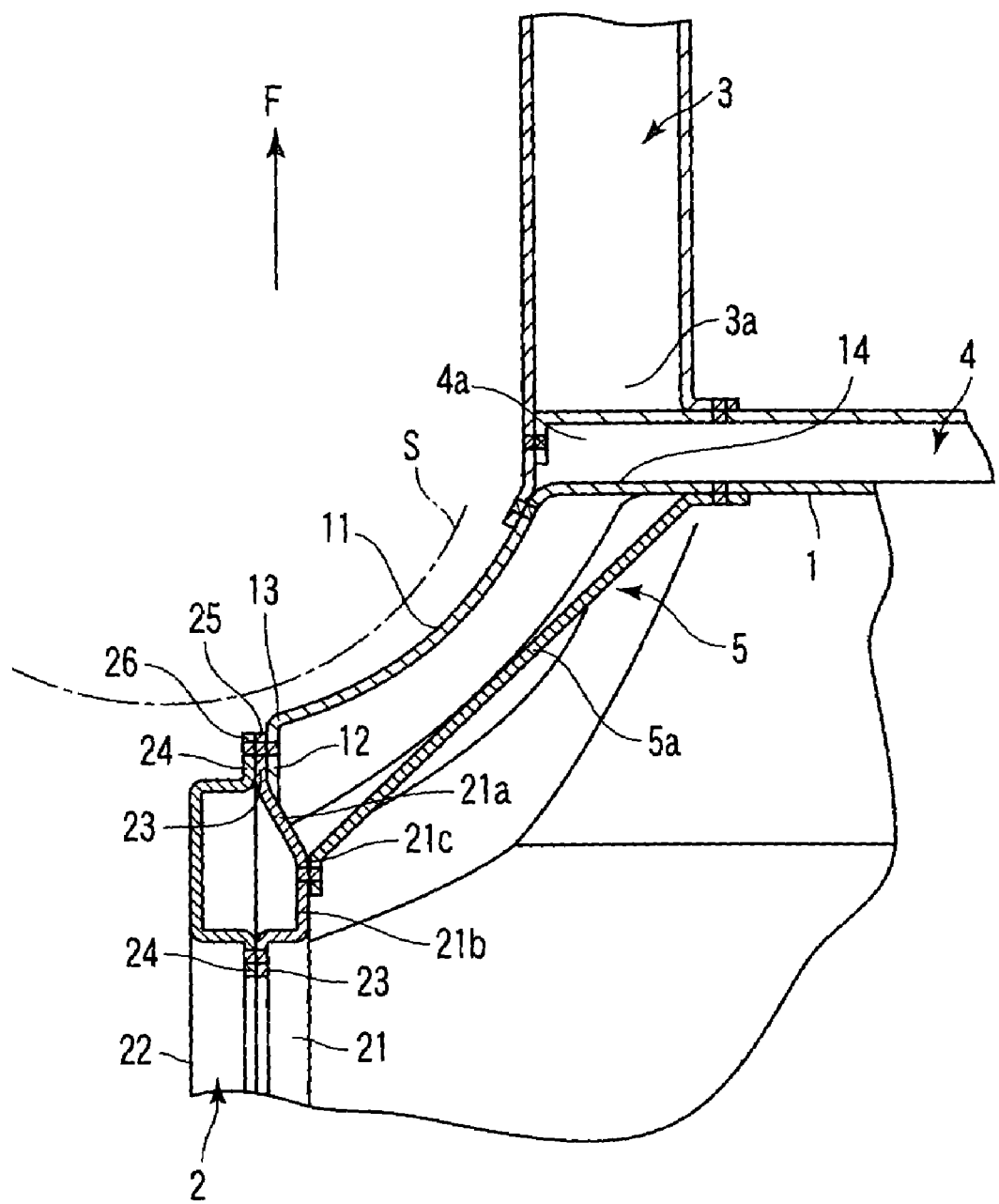
FIG. 2 is a sectional view of the combined structure at a position where a reinforcing member is passed along the F2—F2 line shown in FIG. 1.
Figure 3:
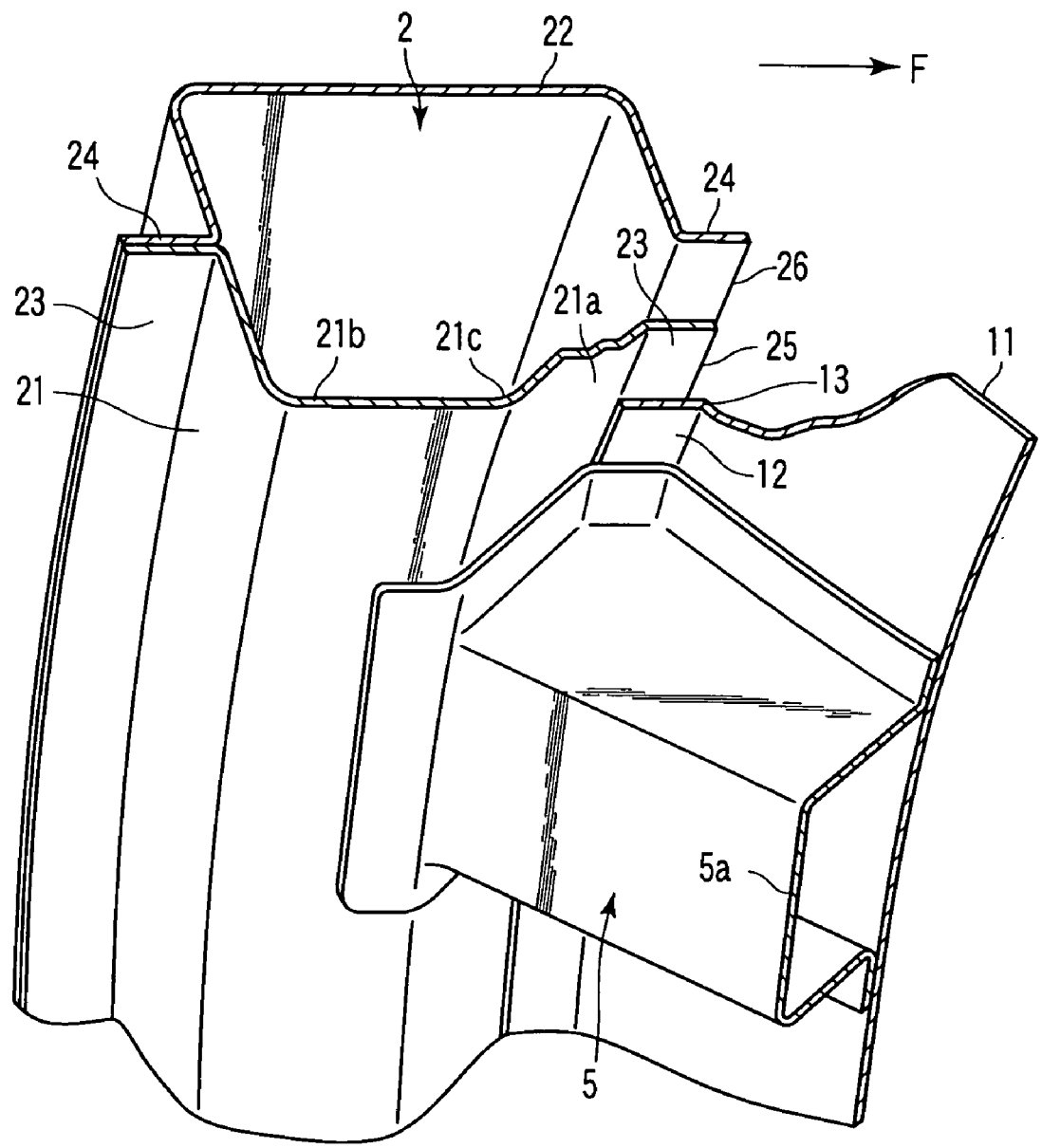
FIG. 3 is a magnified perspective view of the combination of a front pillar, dash panel and reinforcing member of the part F3 shown in FIG. 1.

As shown in FIG. 2, a panel flange 12 is formed at the left and right side edges of the dash panel 1, extending from a side edge 13 to the rearward. The front pillar 2 and dash panel 1 are joined at the position where the front ends 25 and 26 of the pillar flanges 23 and 24 of the front pillar 2 are located rearward than the side edge 13 of the panel flange 12 of the dash panel 1.

The side member 3 is joined to the outer surface of the dash panel 1 more inside in the width direction of the automobile than the front pillar 2 from the outside of the cabin. The side member 3 extends forward from the dash panel 1, and extends rearward from the underside of the dash panel 1 along the floor panel.

The cross member 4 is placed in the width direction of automobile as shown in FIG. 2, and both ends 4a are joined to the rear end 3a of the left and right side members 3. The cross member 4 is joined to the dash panel 1, forming a closed space so-called a closed section that is closed by the dash panel 1 and cross member 4.

The reinforcing member 5 is joined so as to connect the inner 21 of the front pillar 2 to the part 14 of the dash panel 1 from the inside of the cabin where the side member 3 has been attached from outside of the cabin. The reinforcing member 5 forms a closed section against the tire house 11 of the dash panel 1. The rear wall 5a of the reinforcing member 5 comes into contact with a bending portion 21c formed between the front wall 21a and the inside wall 21b of the inner 21.

Next, an example of a process of joining each member will be explained. First, the dash panel 1 and inner 21 are joined. In this case, the dash panel 1 and inner 21 must be joined in at least the area covered by the reinforcing member 5. After joining the inner 21 to the dash panel 1, the reinforcing member 5 is joined to the dash panel 1 and inner 21. The rear ends 3a of the left and right side members 3 are joined to both ends 4a of the cross member 4. The cross member 4 and side member 3 which have been joined to each other are joined to the dash panel 1 that has been joined to the reinforcing member 5.

The outer 22 is joined to the inner 21 and dash panel 1 that has been joined to the reinforcing member 5. In this case, it is permitted to attach the outer 22 either before or after joining the cross member 4 and side member 3 to the dash panel 1. In the area attached the reinforcing member 5, the spot welding torch cannot be inserted. Therefore, the front end 26 of the flange 24 of the outer 22 and the front end 25 of the flange 23 of the inner 21 may be joined like an edge joint by MIG or TIG welding. The above joining procedure is just an example, and other assembling procedures are permitted. It is also permitted to join the pillar flange 23 of the inner 21 from the inside of the panel flange 12 of the dash panel 1, and join the flange 24 of the outer 22 from the outside of the panel flange 12 of the dash panel 1, so as to be sandwiched the panel flange 12 of the dash panel 1 by the pillar flanges 23 and 24 of the front pillar 2.

In the above combined structure of a front part of a cabin an automobile, the panel flange 12 and pillar flanges 23, 24 do not project toward the front wheel in the tire house 11. Therefore, there is no fear of damaging the front wheel by the contact of the panel flange 12 and pillar flanges 23, 24 to the front wheel. Thus, it is possible to place the front pillar 2 near the swinging area S of the front wheel.

The panel flange 12 is formed rearward from both side edges of the dash panel 1, and the front pillar 2 and dash panel 1 are joined so that the front ends 25 and 26 of the pillar flanges 23 and 24 of the front pillar 2 are located more rearward than the side edge 13 of the panel flange 12 of the dash panel 1. Namely, it is possible to set the distance long from the bending portion 21c of the inner 21 to the side edge 13 of the panel flange 12 of the dash panel 1, by the length equivalent to the pillar flanges 23, 24 of the front pillar 2. In other words, it is possible to take a long distance from the rear wall 5a of the reinforcing member 5 to the tire house 11, and to make the closed section large between the reinforcing member 5 and tire house 11. As a result, the strength of the reinforcing member 5 can be increased. And, the load upon collision can be transmitted from the side member 3 to the front pillar 2 through the reinforcing member 5.

Since the front pillar 2 can be approached to the front wheel, the section of the front pillar 2 can be enlarged without moving the front pillar 2 rearwards. Therefore, the strength of the front pillar 2 can be increased.

Further, by assembling each member as described above, in the combined structure of a front part of a cabin of an automobile, each member can be welded at the number of spots sufficient to ensure the molding strength of each part without making a window for spot welding in each member.

In the combined structure of a front part of a cabin of an automobile according to the present invention, the flange joining the front pillar and dash panel is not projected toward the front wheel. Therefore, the front pillar and dash panel can be placed near the front wheel. As a result, it is possible to enlarge the closed section of the front pillar and the closed section surrounded by the reinforcing member and dash panel. Therefore, the rigidity can be increased, and the load applied to the side members upon collision can be efficiently transmitted to the front pillar. Besides, since the dash panel and the front pillar can be plated in the front, the cabin space can be broadened.

As described above, according to the present invention, it is possible to provide a combined structure of a front part of a cabin of an automobile with sufficient strength while keeping a cabin space.

What is claimed is:

1. A combined structure of a front part of a cabin of an automobile comprising:
   a dash panel which is placed in the front part of the cabin, extending in the width direction of the automobile, forming a tire house bulged inwardly of the cabin at both left and right lower sides, and having a panel flange extending rearwardly from both edges thereof; and
   a front pillar which is formed by a front pillar inner and a front pillar outer joined at respective pillar flanges thereof where they are facing each other in the width direction, and in which one of the pillar flanges, which extend forwardly, is joined to the panel flange,
   wherein a front end of the one pillar flange is located more rearwardly than the respective side edge of the dash panel.

2. The combined structure of a front part of a cabin of an automobile according to claim 1, further comprising a reinforcing member which is attached over the dash panel and the front pillar inner.

3. The combined structure of a front part of a cabin of an automobile according to claim 2, further comprising:
   a side member which extends forwardly, and having a rear end joined to the dash panel from the outside of the cabin,
   wherein the reinforcing member is joined to the dash panel from the inside of the cabin, where the side member has been attached from outside of the cabin.

4. The combined structure of a front part of a cabin of an automobile according to claim 3, wherein the front pillar inner has an inside wall, and a front wall bended outwardly from a front edge of the inside wall; and a rear wall of the reinforcing member comes in contact with a bending portion formed between the inside wall and the front wall.

5. The combined structure of a front part of a cabin of an automobile according to claim 3, further comprising:
   a cross member which is extended in the width direction of the automobile and joined to a front side of the dash panel from the outside of cabin;
   wherein the rear end of the side member is joined to the cross member.

6. The combined structure of a front part of a cabin of an automobile according to claim 1, wherein the panel flange is joined to the one pillar flange from the inside of the cabin.

7. A method of combining a front part of a cabin of an automobile comprising:
   a step of joining a panel flange which extends rearwardly from both side edges of a dash panel, to a pillar flange which extends forwardly from a front pillar inner that forms a front pillar with a front pillar outer, at a position where the front end of the pillar flange is located more rearwardly than the both side edges of the dash panel;
   a step of joining a reinforcing member to the dash panel and the front pillar inner;
   a step of joining both ends of a cross member which extends in the width direction of the automobile, to a rear end of a side member which extends forwardly;
   a step of joining the cross member and the side member which have been joined to each other to the dash panel; and
   a step of joining the pillar flange of the front pillar inner and a pillar flange of the front pillar outer.

* * * * *